(12) United States Patent
Alexander (10) Patent No.: US 8,656,398 B2
(45) Date of Patent: Feb. 18, 2014

(54) SYNCHRONIZATION OF WORKFLOWS IN A VIDEO FILE WORKFLOW SYSTEM (75) Inventor: James Alexander, Highlands Ranch, CO (US)

(73) Assignee: Ericsson Television Inc, Duluth, GA (US)

( * ) Notice: Subject to any disclaimer, the term of this patent is extended or adjusted under 35 U.S.C. 154(b) by 434 days.

(21) Appl. No.: 13/099,435

(22) Filed: May 3, 2011

(65) Prior Publication Data

US 2012/0284724 A1     Nov. 8, 2012

(51) Int. Cl.
*G06F 9/46* (2006.01)
*G06F 9/455* (2006.01)

(52) U.S. Cl.
USPC ........................... 718/102; 718/100; 718/101

(58) Field of Classification Search
None
See application file for complete search history.

(56) References Cited

U.S. PATENT DOCUMENTS

| 7,134,047 | B2 | 11/2006 | Quach | |
|---|---|---|---|---|
| 7,805,327 | B1 | 9/2010 | Schulz et al. | |
| 2003/0083923 | A1 * | 5/2003 | Guicciardi et al. | 705/9 |
| 2010/0146146 | A1 | 6/2010 | Welts | |
| 2010/0293027 | A1 * | 11/2010 | Du Fosse | 705/9 |

* cited by examiner

*Primary Examiner* — Kenneth Tang (57) ABSTRACT

A system and method for synchronization of workflows in a video file workflow system. A workflow is created that splits execution of the workflow tasks (in a single, video file workflow) across multiple Content Management Systems (CMSs). When a single workflow is split across two CMSs, which jointly perform the overall workflow, the two resulting workflows are created to essentially mirror each other so that each CMS can track the tasks being executed on the other CMS using synchronization messages. Hence, both CMSs have the same representation of the processing status of the video content at all time. This allows for dual tracking of the workflow process and for independent operations, at different CMSs, when the CMS systems require load balancing. The split-processing based synchronization can be implemented in the workflows themselves or with simple modifications to workflow templates, without requiring any modification of the software of the workflow systems.

18 Claims, 7 Drawing Sheets

SYNCHRONIZATION OF WORKFLOWS IN A VIDEO FILE WORKFLOW SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to Content Management Systems (CMSs). More particularly, and not by way of limitation, the present invention is directed to a system and method for synchronizing a single workflow for video content on two separate CMSs.

A CMS is used to control and edit electronic content. Electronic content includes electronic files, images and video based media, audio files, electronic documents, web text, and the like. A CMS makes the content files available for editing inter-office or over the Internet. Companies using a CMS can share content with others easily, since most CMSs are server-based. Thus, more generally speaking, a CMS is a collection of procedures used to manage workflow in a collaborative environment. These procedures can be manual and/or computer-based. The procedures in a CMS (i) allow for a large number of people to contribute to and share stored data, (ii) control access to data, based on user rules (defining which information users or user groups can view, edit, publish, etc.), (iii) aid in easy storage and retrieval of data, (iv) reduce repetitive duplicate input, and (v) improve communication between users.

In the context of a CMS, workflow is a process of creating cycles of sequential and/or parallel tasks that must be accomplished in the CMS. For example, in case of management of a video file, one or many content creators can submit the video file in a specific format, but the file may not be shared with others or published for sharing until it is approved by a QA (Quality Assurance) system in the CMS. Most CMSs use a database to store content, metadata, or other artifacts that might be needed by the system. Content may be typically stored as video, audio or other data files, whereas the metadata may be stored as XML (Extensible Mark-up Language) and represent specific elements of the content files. A presentation layer in the CMS may process, manipulate, or display the content to a user based on a set of templates for the workflows in the CMS. The templates are sometimes XML Stylesheet Language for Transformations (XSLT) files.

Figure 1:
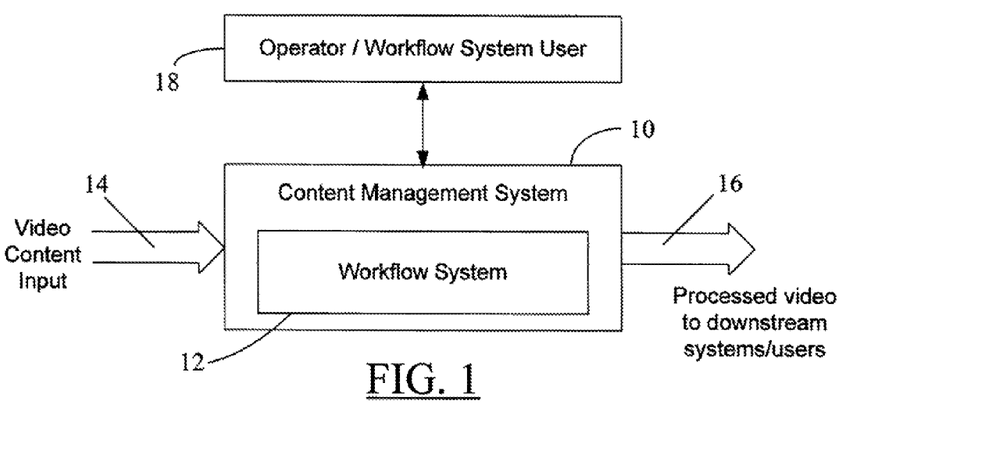
FIG. 1 illustrates a Content Management System (CMS) having a workflow system to manage and process video content.

A workflow system for the management of video file processing (in a CMS) implements a sequence of steps that are executed (in the CMS) to prepare video for delivery to downstream systems. FIG. 1 illustrates a CMS 10 having a workflow system 12 to manage and process video content. The CMS 10 may receive the video content from input from different users or from a video content generator (e.g., a television studio). The video content input is indicated by an arrow having reference numeral "14." The CMS-processed video content may be delivered to downstream users/systems (e.g., website visitors, television channel subscribers, television set-top boxes, etc.) as indicated by an arrow having reference numeral "16." A human operator or workflow system user 18 may interact with the CMS 10 to monitor the status of task completion in the workflow and/or to possibly edit/change the workflow if needed.

In case of the workflow system 12 for management of video file processing, a video file may be delivered to the system 12 in Moving Picture Experts Group phase 4 (MPEG-4) format, and may require processing as follows: (i) ingest the content; (ii) update the metadata in the input video file; (iii) transcode the content to MPEG-2 using a third party transcoder; (iv) perform Quality Assurance (QA) of the MPEG-2 file using a third party QA system; (v) package the MPEG-2 content and its metadata; and (vi) deliver the package to a downstream system/user. For example, a High Definition (HD) television channel from a television studio may be received at a cable operator's head end (not shown) in MPEG-4 and captured by a time-shift TV application in the head end. The time-shift application may then need to transcode the MPEG-4 content into an MPEG-2 content and send it to a Video-On-Demand (VOD) server (not shown) in the cable operator's system, because the VOD server may only operate on MPEG-2 video content. Currently, the workflow system 12 can manage the above-described MPEG-4 to MPEG-2 transcoding steps of the workflow by executing (in the CMS 10) an ordered sequence of task notes. The CMS 10 may also represent to the user 18 the part of the workflow that has been completed and the status of the tasks in the workflow. A suitable template (not shown) may be used to display the completion status of workflow tasks.

SUMMARY

As discussed before, a single CMS (e.g., the CMS 10 in FIG. 1) can manage a workflow to process a video file. However, some workflow system users require more than one CMS to manage a single workflow. This may be because of geographical limitations on the third party equipment, people, or other reasons. For example, in the video file-processing example discussed above with reference to FIG. 1, one CMS may have the transcoding equipment and may be located at a different geographical location than the other CMS, which may have the QA equipment. Current workflow systems for the preparation of video content cannot split a workflow across more than one CMS. It is therefore desirable to be able to run a single workflow on two different CMSs.

The present invention provides a solution to the problem of splitting video file workflow across more than one CMS. The present invention supports the creation of a workflow that splits execution of the workflow tasks across multiple workflow systems. For example, a single workflow may be split across two workflow systems that jointly perform the overall workflow. The two resulting workflows are created to essentially mirror each other so that each CMS can track the tasks being executed on the other CMS using synchronization messages. Hence, both CMSs have the same representation of the processing status of the video content at all time.

In one embodiment, the present invention is directed to a method of managing a single workflow for video content on a pair of separate CMSs including a first CMS and a second CMS. The method comprises dividing the single workflow into a pair of mirrored workflows including a first workflow and a second workflow, wherein the first and the second workflows jointly represent all tasks defined in the single workflow. The method also comprises sequentially executing first tasks in the first workflow using the first CMS while tracking execution of the first tasks by the first CMS using corresponding first mirrored tasks in the second workflow in the second CMS. Upon conclusion of execution of the first tasks by the first CMS, the method further comprises sequentially executing second tasks in the second workflow using the second CMS while tracking execution of the second tasks by the second CMS using corresponding second mirrored tasks in the first workflow in the first CMS, thereby maintaining an identical representation of execution of the single workflow on each of the first and the second CMSs.

In another embodiment, the present invention is directed to a method of managing a single workflow for video content on a pair of separate CMSs including a first CMS and a second CMS. The method comprises: defining the single workflow as if the single workflow were to be executed on a single CMS; and dividing the single workflow into a pair of mirrored workflows, wherein workflows in the pair of mirrored workflows jointly perform all tasks defined in the single workflow, and wherein the pair of mirrored workflows includes: a first workflow that includes a first set of tasks to be executed by the first CMS and a first set of mirrored tasks for the first CMS to track execution of tasks by the second CMS, and a second workflow that includes a second set of tasks to be executed by the second CMS and a second set of mirrored tasks for the second CMS to track execution of tasks by the first CMS, wherein the first set of mirrored tasks corresponds to the second set of tasks and the second set of mirrored tasks corresponds to the first set of tasks. The method also comprises: sequentially executing tasks in the first set of tasks in the first workflow using the first CMS; and, using the first CMS, synchronizing execution of the first set of tasks with the second CMS via the second set of mirrored tasks. Upon conclusion of execution of tasks in the first set of tasks by the first CMS, the method further comprises: sequentially executing tasks in the second set of tasks in the second workflow using the second CMS; and, using the second CMS, synchronizing execution of the second set of tasks with the first CMS via the first set of mirrored tasks, thereby maintaining an identical representation of execution of the single workflow on each of the first and the second CMSs.

In another embodiment, the present invention is directed to a system for splitting execution of a single workflow for video content across a pair of separate CMSs including a first CMS and a second CMS. The system comprises the first CMS configured to perform the following: receive a first workflow containing a first portion of tasks from the single workflow, wherein the first workflow includes a first set of tasks and a first set of mirrored tasks, sequentially execute tasks in the first set of tasks, and, upon conclusion of execution of the first set of tasks, track execution of tasks by the second CMS using the first set of mirrored tasks. The system also comprises the second CMS configured to receive a second workflow containing a second portion of tasks from the single workflow, wherein the second workflow includes a second set of tasks and a second set of mirrored tasks, wherein the first and the second portions jointly represent all tasks in the single workflow, and wherein the second set of tasks corresponds to the first set of mirrored tasks and the second set of mirrored tasks corresponds to the first set of tasks. In the system, while the first CMS is executing the first set of tasks, the second CMS is also configured to track execution of tasks by the first CMS using the second set of mirrored tasks, and to sequentially execute tasks in the second set of tasks upon conclusion of execution of the first set of tasks by the first CMS.

The present invention thus provides a system and method for synchronization of workflows in a video file workflow system in such a manner that allows for the use of multiple CMSs to implement a single workflow. The present invention thus allows for dual tracking of the workflow process and for independent operations (at different CMSs) when the CMSs require load balancing. The split-processing based synchronization can be implemented in the workflows themselves or with simple modifications to workflow templates, without requiring any modification of the software of the workflow systems that manage those workflows.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention can be implemented to enable any video content owner/receiver to more flexibly process the video content across multiple Content Management Systems.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "System-1") may be occasionally interchangeably used with its non-hyphenated version (e.g., "System 1"), and a capitalized entry (e.g., "Workflow") may be interchangeably used with its non-capitalized versions (e.g., "workflow"). Such occasional interchangeable uses shall not be considered inconsistent with each other.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing video data information or non-data/control information) to the second entity regardless of the type (analog or digital) of those signals. It is further noted that various figures (including component diagrams) shown and discussed herein are for illustrative purpose only, and are not drawn to scale.

Figure 2:
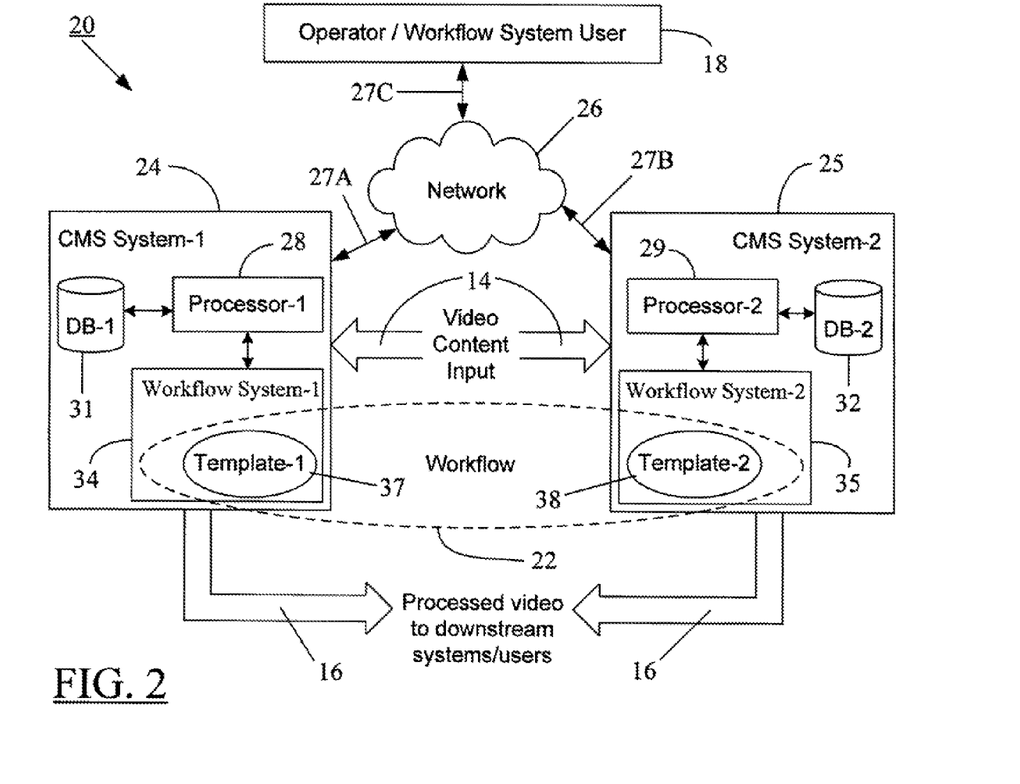
FIG. 2 shows an exemplary system for synchronization of a single workflow across two different CMSs according to one embodiment of the present invention.

FIG. 2 shows an exemplary system 20 for synchronization of a single workflow 22 (illustrated by a dotted oval) across two different CMS systems 24-25 according to one embodiment of the present invention. It should be noted that in the discussion herein, the terms "CMS" and "CMS system" are used interchangeably to refer to a system having CMS functionality—whether implemented in hardware, software, or a combination of both. Similarly, a task depicted in a template of a workflow may be interchangeably referred to as being executed by a workflow system (e.g., the workflow system 24) or the corresponding CMS system (e.g., the CMS system 24) depending on the context of discussion.

Each CMS system 24, 25 receives all of the input video content 14, but processes the content differently as discussed in more detail below. As mentioned before, there may be situations when the execution of the workflow 22 needs to be split between two different CMSs, e.g., when the two different CMS systems 24-25 are geographically diverse and each may only be able to process a part of the entire workflow 22. For example, in the embodiment of FIG. 2, the CMS system-1 may execute those tasks in the workflow 22 that relate to transcoding of input video content 14 from MPEG-4 format to MPEG-2 format, whereas the CMS system-2 may execute QA-related tasks in the workflow 22—i.e., QA checking of transcoding performed by CMS system-1. Both of the CMS systems 24-25 may be connected to each other (i.e., in electrical communication with each other) via a communication network 26, which may also connect the operator/user 18 to the two CMSs 24-25, as illustrated by three bi-directional arrows 27A, 27B, and 27C. In one embodiment, instead of a single user 18 in charge of the two CMS systems 24-25, two separate users (not shown) may be assigned to individually operate each CMS system 24-25. In another embodiment, some or all functions to be performed by a human user 18 may be carried out in an automated fashion.

Although the discussion herein focuses on the input video data 14 having an MPEG-4 format, it is understood that the input video content may be live streaming video or video files digitized in one of many possible video file formats including, for example, a Motion Picture Experts Group (MPEG) file format, an Audio Video Interleaved (AVI) file format, a Windows Media Video (WMV) file format, a Joint Photographic Experts Group (JPEG) file format, uncompressed RGB video data, or any other suitable media file format for video contents.

The communication network 26 may be any data communication network such as an Ethernet Local Area Network (LAN) connecting all the computers/servers within a facility, e.g., a corporate headquarter, a corporate data processing center, or a cable TV operator's head end. In that case, although the two CMS systems 24-25 are different, they still may be physically located at the same site. In alternative embodiments, the communication network 26 may include, independently or in combination, any of the present or future wireline or wireless data communication networks, e.g., the Internet, the Public Switched Telephone Network (PSTN), a cellular telephone network, a Wide. Area Network (WAN), a satellite-based communication link, a Metropolitan Area Network (MAN), and the like.

In one embodiment, each CMS system 24, 25 may be a data processing or computing unit (e.g., a general purpose computer or PC, a workstation, a server, etc.) having CMS functionality. In that case, a processor 28, 29 in the respective CMS system 24, 25 may execute a CMS application (software or program code) to enable the respective CMS system 24-25 to provide CMS functionality. In one embodiment, each CMS system 24-25 is a server based on a Java™ workflow engine. In other embodiments, different server platforms (e.g., a Structured Query Language (SQL) server) may be used instead.

Figure 3:
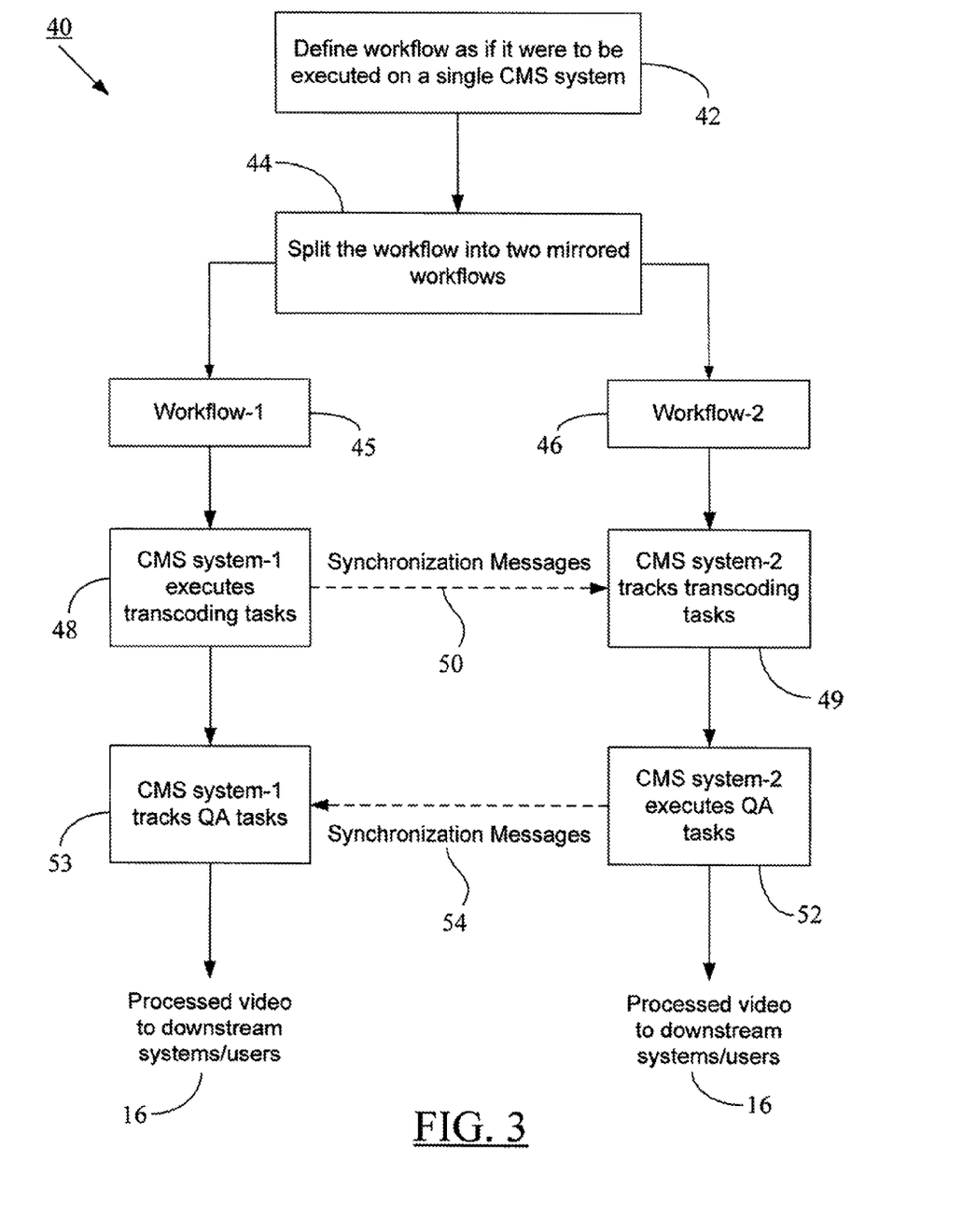
FIG. 3 is an exemplary operational flowchart for the system of FIG. 2 according to one embodiment of the present invention.

The processors 28-29 may also perform corresponding workflow execution functionalities discussed herein with reference to the flowchart in FIG. 3 and the workflow templates in FIGS. 5A-5D. Each CMS system 24-25 may also include a respective computer-readable data storage medium (also interchangeably referred to herein as "memory" or "database") 31-32 containing program code for CMS functionality as well as program code to perform workflow execution. The processors 28, 29 may execute instructions (or program code) stored in the respective memory 31, 32 to perform the tasks illustrated in the flowchart in FIG. 3 and in the templates in FIGS. 5A-5D. The databases 31, 32 may also provide necessary data storage (e.g., storage of input video file in MPEG-4, storage of transcoded video file in MPEG-2, storage of related metadata for these video files, etc.) and retrieval during various stages of data processing being performed by respective processors 28, 29.

Each processor 28, 29 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. One or more of the processors 28, 29 may employ distributed processing in certain embodiments.

As mentioned before, the methodology provided herein (related to split-processing of a video file workflow in a synchronized manner across two different CMSs) may be implemented in a computer program, software, or firmware incorporated in a computer-readable storage medium (e.g., the memories 31, 32 in FIG. 2) for execution by a general purpose computer or a processor (e.g., the processors 28, 29 in FIG. 2). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, one or more of the databases 31, 32 may employ distributed data storage with/without redundancy.

In FIG. 2, each CMS 24, 25 is shown to also include a respective workflow system 34, 35 to allow the user 18 to manage the execution of the single workflow 22 via execution of tasks in CMS system-specific workflow templates 37, 38, respectively. As discussed in more detail below, the original singular workflow 22 may be split into two mirrored workflows (not shown) represented by templates 37, 38, wherein each template 37-38 provides an ordered sequence of tasks in each respective mirrored workflow. Each workflow system 34-35 may execute and track (as discussed later below), through the corresponding processor 28-29 and memory 31-32, tasks in respective template 34-35 so as to accomplish split execution of the workflow 22. When all tasks in each workflow system 34-35 are processed, the execution of the workflow 22 concludes. At that time, both CMS systems 24-25 may have the same representation of the processing status of the input video content, as represented by each system's output having the same reference numeral "16," which also indicates that the same processing result may be obtained through split processing according to the present invention as in the single CMS system-based processing discussed with reference to FIG. 1 hereinbefore.

It is noted here that additional architectural details of the CMS systems 24-25 are not shown in FIG. 2 merely for the sake of simplicity. Thus, for example, input/output (I/O) devices (e.g., a computer keyboard, a touch-screen, a computer display monitor, a computer mouse, etc.) attached to or associated with each CMS system 24-25 are not shown in FIG. 2. Similarly, additional external devices (e.g., a VOD server) that may receive processed outputs from one or more of the CMS systems 24-25 are also not illustrated in FIG. 2 for the sake of simplicity. However, it is understood that various I/O and other external devices/systems may be used in conjunction with the CMS systems 24-25 to accomplish various user functions, e.g., to input data, to modify a workflow template, to display tasks in a template, to view results of task completion, etc.

Figure 4:
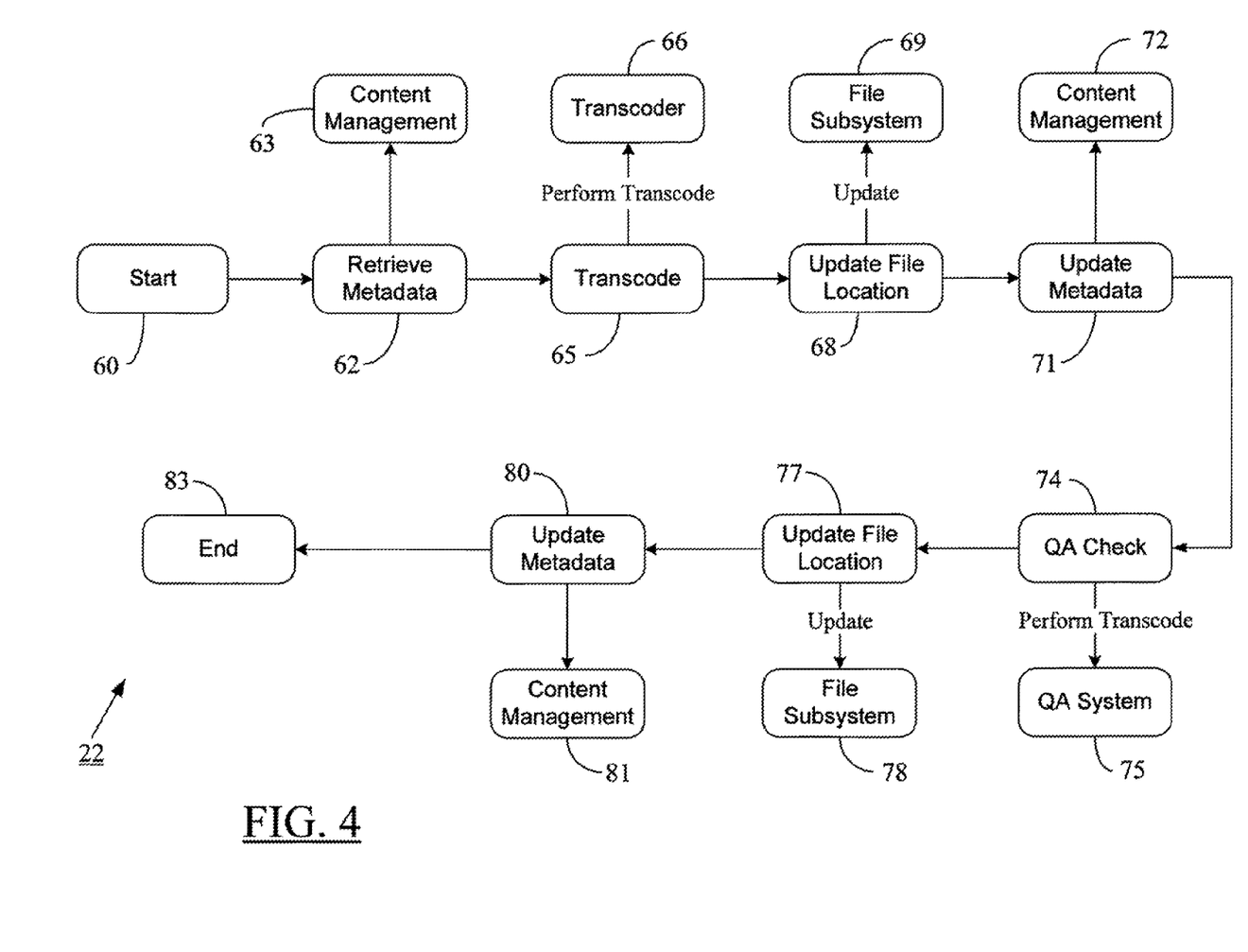
FIG. 4 shows an example of a workflow that may be split between the two CMSs of FIG. 2.

FIG. 3 is an exemplary operational flowchart 40 for the system 20 in FIG. 2 according to one embodiment of the present invention. As mentioned before, the present invention supports creation of a workflow that splits execution of the workflow across two workflow systems 34-35 (in two different CMSs 24-25). Initially, at block 42, the operator or other workflow system user 18 may define the workflow 22 as if the workflow 22 were to be executed on a single CMS (or workflow) system. One such single workflow 22 is illustrated in FIG. 4 and is discussed further below. After the workflow is defined in this manner, the user 18 may split the workflow 22 into two mirrored workflows (identified by templates 37-38 in FIG. 2) as indicated at block 44 in FIG. 3. Thus, the user 18 creates two CMS system-specific workflows for the two CMS systems 24-25 in such a manner that the two workflows jointly perform all tasks defined in the single workflow 22. The mirrored workflows are created in such a manner as to account for each CMS system's capability and limitations (e.g., as mentioned before, one CMS system may only perform video transcoding whereas the other CMS system may only perform QA-related tasks). The two resulting workflows 45, and 46 in FIG. 3 are thus created to essentially mirror each other. Thus, for example, the workflow system-1 34 (in the CMS system 24) may have transcoders and, hence, may be assigned to execute transcoding related tasks (e.g., to transcode an MPEG-4 video file into an MPEG-2 video file). Thus, the workflow system 34 may execute (e.g., sequentially) all transcoding tasks in the corresponding workflow 45 (block 48, FIG. 3). The other workflow system 35 (which is not performing transcoding) may have "mirrored" transcoding tasks in its workflow 46. The second workflow system 35 may use these mirrored transcoding tasks to track the execution of actual transcoding tasks by the first workflow system 34 (i.e., in the CMS system 24) (block 49, FIG. 3). The template 37 in the first CMS system 24 may be created (e.g., by the user 18) in such a manner that the first CMS system 24 may send synchronization messages (as shown by a dotted arrow 50 in FIG. 3) upon completion of each task assigned thereto (as discussed in more detail with reference to FIGS. 5A-5D) so as to enable the second CMS system 25 to track execution of transcoding tasks being performed at the first CMS 24.

After completion of all transcoding by the first CMS system 24 (e.g., by the workflow system 34 in the CMS system 24), the second CMS system 25 may commence execution of tasks (e.g., QA-related tasks) assigned thereto in its workflow 46. For example, the workflow system-2 35 may have QA systems and may be capable of performing QA of the video content transcoded by the workflow system-1 34. In that case, the workflow system-2 35 may commence sequential execution of all QA-related tasks in its workflow 46 (block 52, FIG. 3). The other workflow system (i.e., workflow. system-1 34) which is not performing QA tasks may have "mirrored" QA tasks in its workflow 45. The first workflow system 34 may use these mirrored QA tasks to track the execution of actual QA tasks by the second workflow system 35 (i.e., in the CMS system 25) (block 53, FIG. 3). The template 38 in the second CMS system 25 may be created (e.g., by the user 18) in such a manner that the second CMS system 25 may send synchronization messages (as shown by a dotted arrow 54 in FIG. 3) upon completion of each task assigned thereto (as discussed in more detail with reference to FIGS. 5A-5D) so as to enable the first CMS system 24 to track execution of QA tasks being performed at the second CMS system 25. Thus, through exchange of synchronization messages, each CMS system 24-25 can maintain an identical representation of the processing status of the incoming video content 14 at all time.

FIG. 4 shows an example of a workflow (e.g., the workflow 22 in FIG. 2) that may be split between two CMS systems 24-25 in FIG. 2. Thus, the single workflow 22 in FIG. 4 may be processed by two different CMS systems 24-25 as discussed later below with reference to FIGS. 5A-5D. As discussed earlier, the workflow 22 may relate to, for example, transcoding of an input video file from MPEG-4 to MPEG-2 format and QA check of the transcoded MPEG-2 video file. To accomplish these objectives, the workflow 22 may start at block 60 and may provide for sequential processing of the following tasks: (i) retrieval of metadata of the input video file (block 62) from a database as part of content management (block 63); (ii) transcoding of the input video file from MPEG-4 to MPEG-2 format (block 65) using a transcoder system or software utility (block 66); (iii) updating of the transcoded file location (block 68) in a file subsystem in a CMS (block 69); (iv) updating of metadata of the transcoded file (block 71) in the database again as part of content management (block 72); (v) QA check of the transcoded MPEG-2 file (block 74) by re-performing transcoding of the input MPEG-4 file using a QA system/software (block 75); (vi) updating the file location of the transcoded MPEG-2 file in the file subsystem (blocks 77, 78) based on the results of the QA check at block 74; and (vii) updating metadata of the QA-checked transcoded MPEG-2 file (block 80) in the database for content management (block 81). The workflow may then conclude at block 83.

FIGS. 5A through 5D illustrate details of two CMS-specific templates (e.g., templates 37 and 38 in FIG. 2) to perform split execution of the tasks in the workflow 22 in FIG. 4 according to one embodiment of the present invention. To more clearly illustrate split processing of a single workflow 22 across multiple CMSs (e.g., CMSs 24-25 in the example in FIGS. 2-5), identical tasks in the workflow 22 and in the corresponding template 37 or 38 are labeled using the same reference numerals. It is seen from FIGS. 5A-5D that the user 18 may create the templates 37-38 such that the transcoding-related tasks are provided for execution in the template 37 for the portion of the workflow 22 to be executed in the CMS system 24, whereas QA-checking related tasks are provided for execution in the template 38 for the portion of the workflow 22 to be executed in the other CMS system 25. The tasks already discussed with reference to FIG. 4 are not discussed further herein for the sake of brevity.

In FIGS. 2-5, it is assumed that CMS system-1 24 initiates processing and, hence, it first starts the sequential task execution at block 86. According to the teachings of the present invention, when the single workflow 22 is split across two CMSs 24-25 via two CMS-specific workflows 45-46 (FIG. 3), each task in the original workflow 22 is assigned to only one of the two workflows 45-46 whereas a corresponding "mirror" task is assigned to the other workflow. Thus, in the templates 37 and 38 in FIGS. 5A-5D, transcoding-related "mirror" tasks in the template 38 are identified by reference numerals 94-95, 97-98, 100-101, and 102-103, whereas QA-related "mirror" tasks in the template 37 are identified by reference numerals 112-113, 115-116, and 118-119. Furthermore, each non-mirror task being executed may have a synchronization event associated with it in the respective template (e.g., by the user 18 creating the template). This synchronization event is triggered and sent to the other (tracking) CMS after the task is completed. As part of a synchronization event, one or more synchronization messages—which are identified by reference numeral "50" in FIGS. 3 and 5 if originating from the CMS 24 and by reference numeral "54" if originating from the CMS 25—may be sent from the CMS that is currently executing, a task to the other CMS that is tracking that task. In one embodiment, synchronization messages may be in an XML format. It is noted here that synchronization messages originating from different CMSs are identified by different reference numerals merely for the sake of convenience. In a practical implementation, all synchronization messages may be data messages having an identical format or syntax.

Figure 5A:
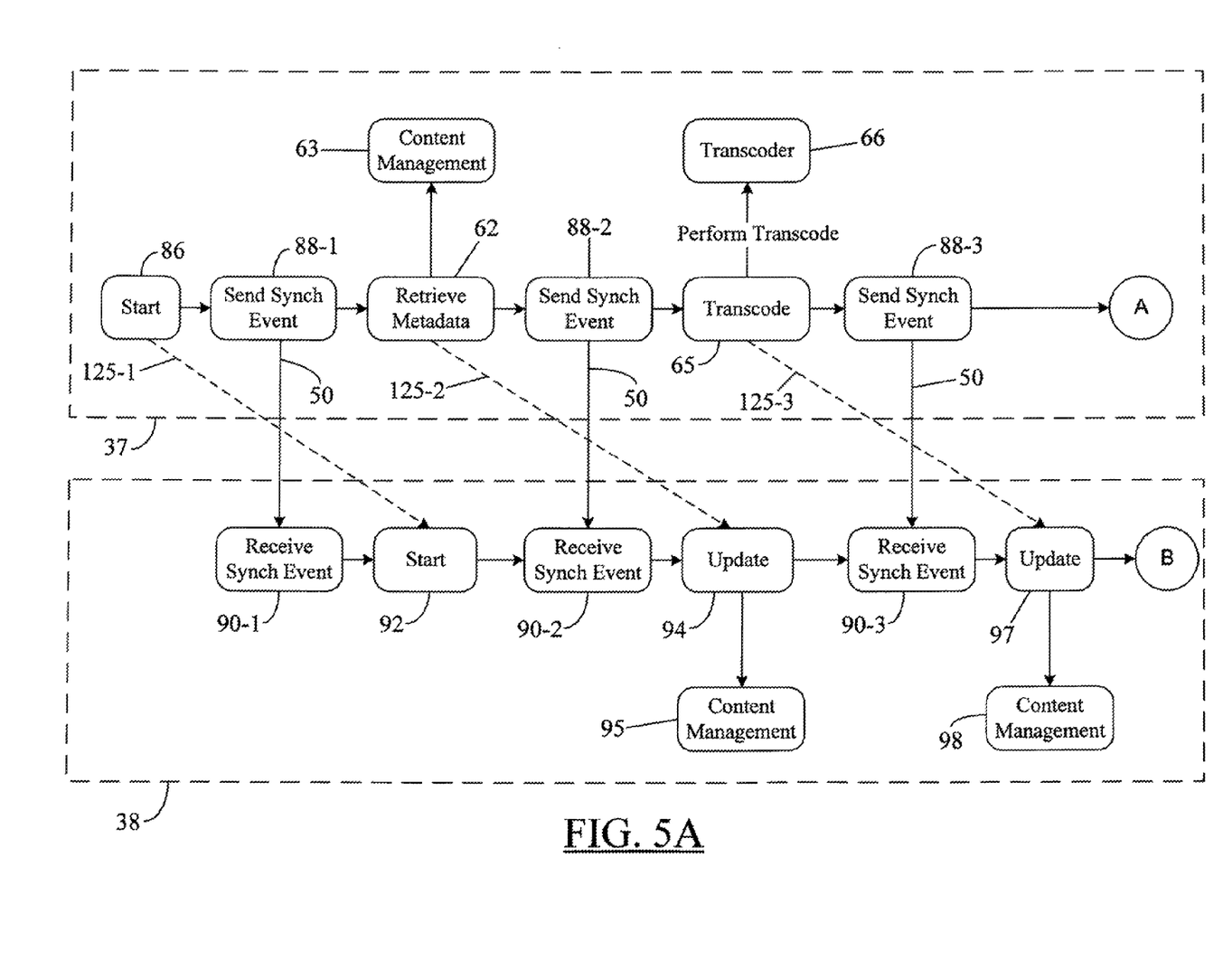
FIGS. 5A through 5D illustrate details of two CMS-specific templates to perform split execution of the tasks in the workflow of FIG. 4 according to one embodiment of the present invention.

Referring now to FIG. 5A, once the CMS system 24 initiates processing at block 86, a synchronization event 88-1 is sent to the CMS 25 using one or more synchronization messages 50. Upon reception of the synchronization event (indicated by reference numeral "90-1"), the second CMS 25 may also enter the "start" state (block 92) to track execution of transcoding-related tasks in the first CMS 24. In FIGS. 5A-5D, synchronization events sent by the first CMS 24 are identified by reference numerals 88-1, 88-2, 88-3, 88-4, and 88-5, and corresponding synchronization event receptions in the second CMS 25 are identified by reference numerals 90-1 through 90-5. Similarly, synchronization events set by the second CMS 25 (during execution of QA-related tasks) are identified by reference numerals 106-1 through 106-4, and corresponding receptions in the first CMS 24 are identified by reference numerals 108-1 through 108-4. In the embodiment of FIGS. 5A-5D, except for the "Start" tasks 86 and 92, when a synchronization event is received by a mirroring task, then the database of that CMS (executing the mirroring task) is updated with the content from the synchronization message, and both workflow systems 34-35 (in the respective CMSs 24-25) will proceed to execute the next task and the corresponding mirror task. For example, as shown in FIG. 5A, after execution of the "Retrieve Metadata" task (block 62), a synchronization event 88-2 may be sent from the CMS 24 to CMS 25 (which is currently mirroring transcoding-related tasks being executed in the CMS 24). Upon reception of this synchronization event at block 90-2, the second CMS 25 may perform the "mirror" task of updating its database content (e.g., the database 32 in FIG. 2) at blocks 94-95 using the metadata values that may received through one or more synchronization messages from the CMS 24. Thus, each "mirror" task may essentially perform an updating of the respective database with the most-recent task execution data received through synchronization. In FIGS. 5A-5D, each "original" task and corresponding "mirror" task are shown linked by a dotted arrow pointing from the original task to the mirror task. Such dotted arrows are labeled with reference numerals 125-1 through 125-9. Also, in FIGS. 5A-5D, continuity between two successive figures is indicated by circled letters "A", "B", "C", "D", "E", and "F" as shown.

Figure 5B:
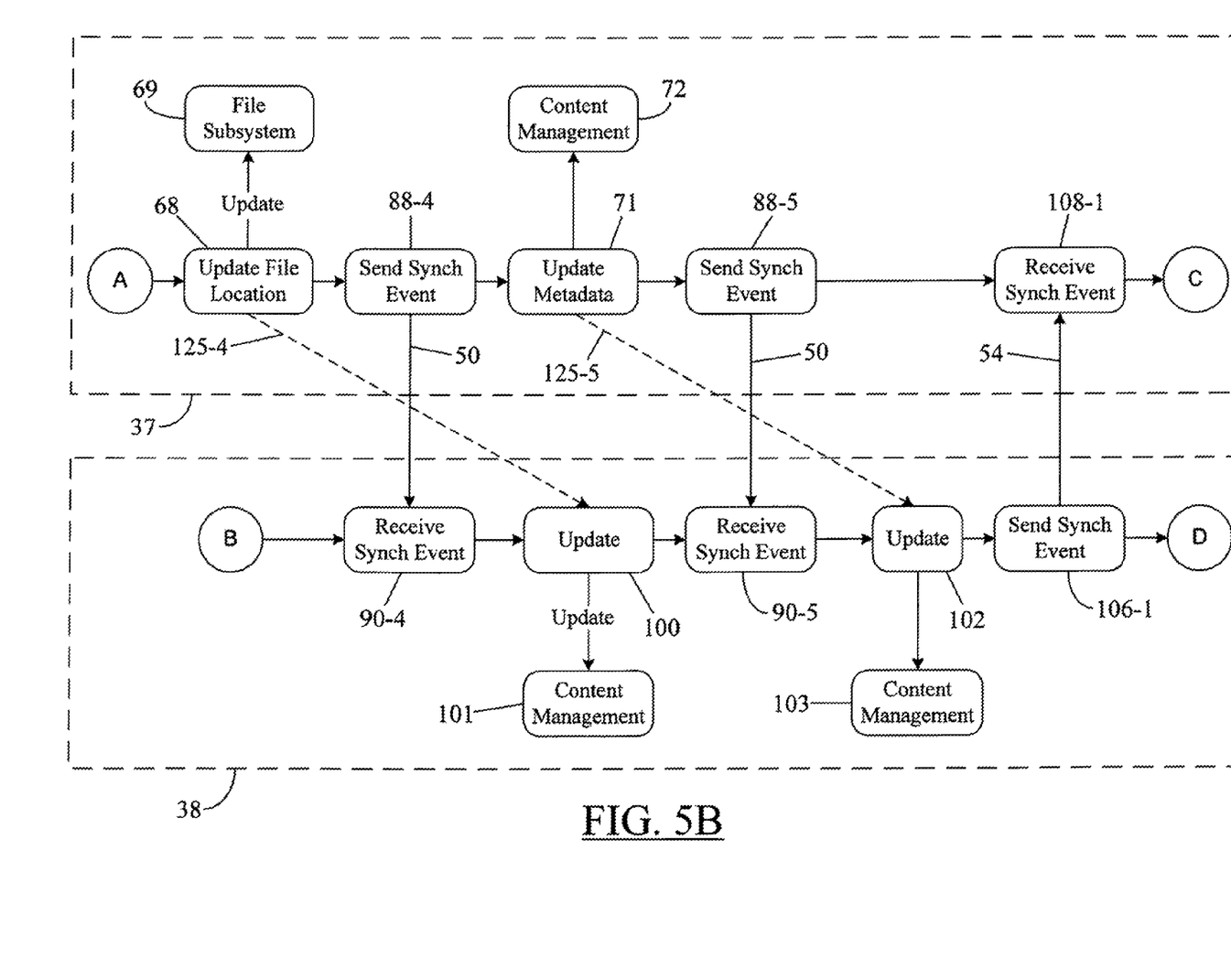
Figure 5C:
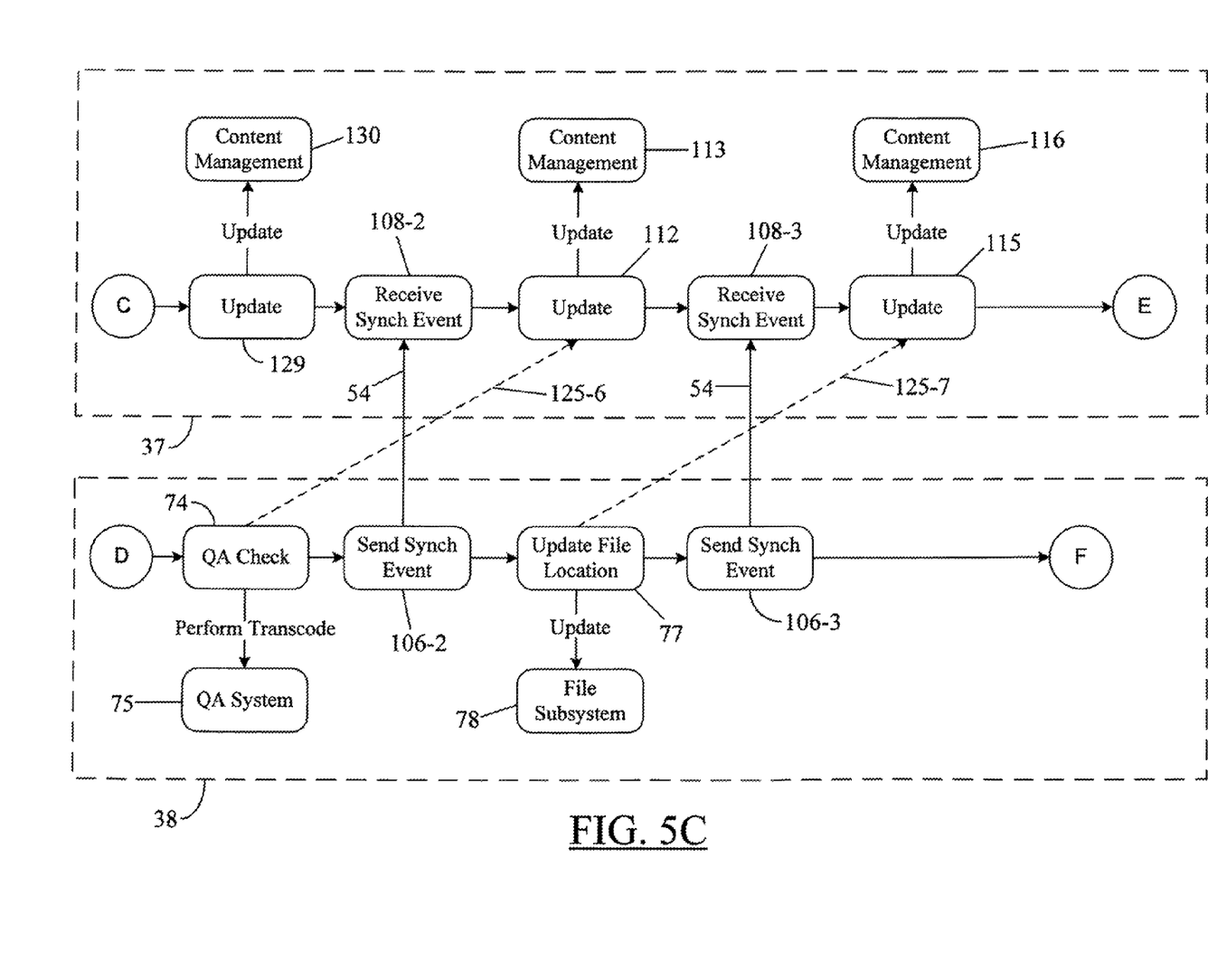
Figure 5D:
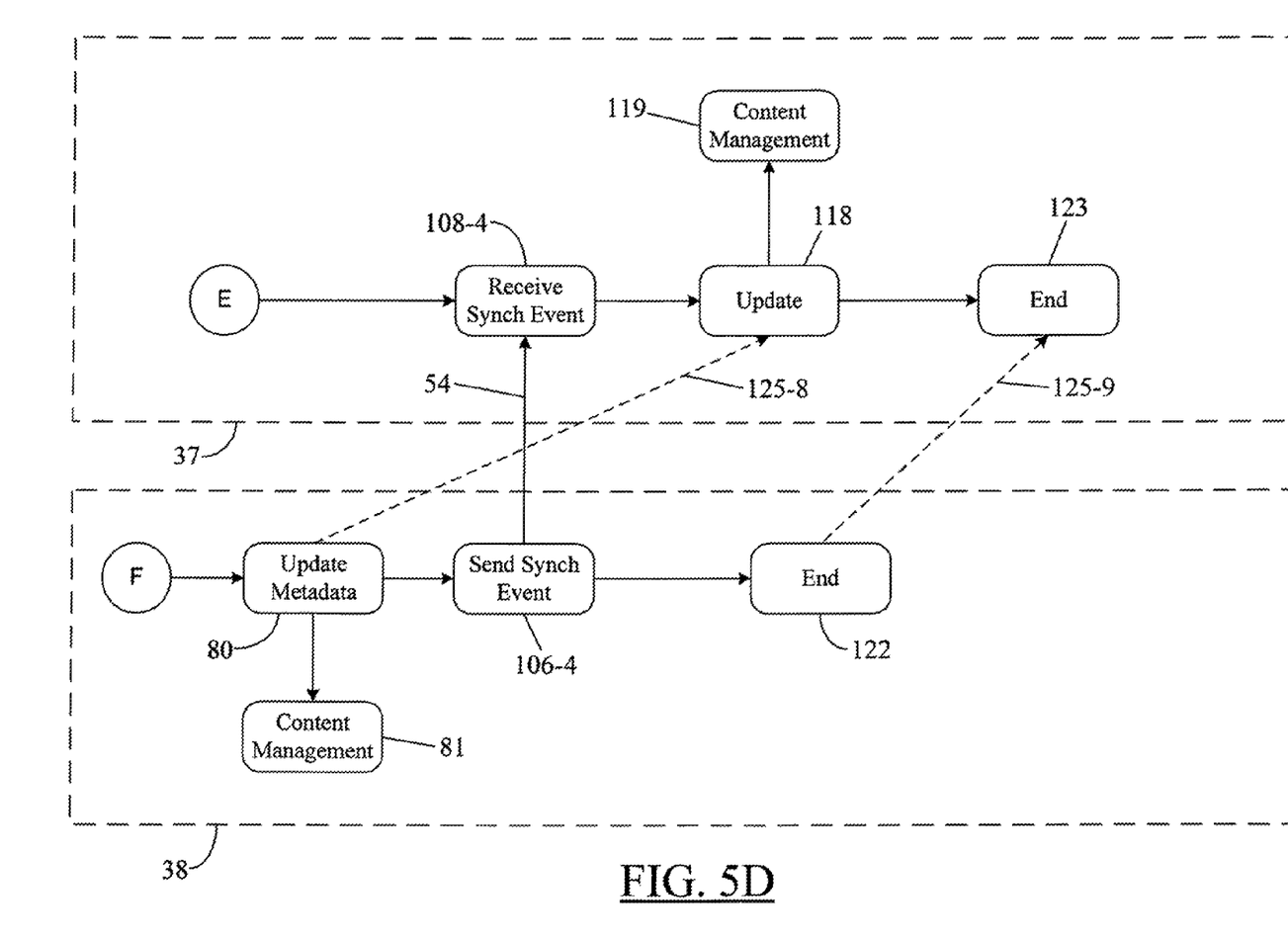

In view of the above discussion of the "mirror" task at block 94, further discussion of each similar "mirror" task and corresponding synchronization event in FIGS. 5A-5D is not provided herein for the sake of brevity. In summary, in the exemplary templates 37-38 in FIGS. 5A-5D, the workflow system-1 34 may begin processing of the respective portion of the workflow 22 (as identified in template 37) and sequentially execute transcoding tasks as shown in FIGS. 5A and 5B. Each task execution may be followed by sending of a synchronization message(s) to the other workflow system 35. On receipt of the synchronization message(s), the second system 35 my update its representation of the task completion (at the first system 34). Similarly, when the transcoding-related task execution is over, the second workflow system 35 may take over control of the processing by sending a synchronization event 106-1 to the first workflow system 34 as shown in FIG. 5B. Upon receiving the synchronization event at block 108-1, the first workflow system 34 may optionally perform content updating (blocks 129-130 in FIG. 5C) to synchronize its state with that of the second workflow system 35. Thereafter, the second workflow system 35 may commence sequential execution of QA tasks as shown in FIGS. 5C and 5D. As in case of the first workflow system 34, the second workflow system 35 also sends synchronization messages after completion of each QA-related task, thereby enabling the first workflow system 34 to update its database (e.g., database 31 in FIG. 2). The process in FIGS. 5A-5D continues until all tasks in the original workflow 22 (as represented through templates 37-38) are completed, and both CMS systems 24-25 have the same (or identical) representation of the processing status of the input video content (as indicated by the "End" blocks 122-123 in FIG. 5D).

It is observed here that when the workflow 22 is processed at a single CMS (e.g., CMS 10 in FIG. 1), all the tasks therein may be sequentially executed as illustrated in FIG. 4 to accomplish the transcoding and QA functions for the input video content. However, when the workflow execution is split across two CMSs 24-25 according to one embodiment of the present invention, the same final result may be obtained by sequentially executing CMS-specific tasks at each of the two CMSs 24-25 and coordinating tracking of task execution status between the two CMSs using synchronization messages as discussed with reference to FIGS. 5A-5D. It is noted here that the two CMS-based embodiment in FIGS. 2-3 and 5 is for illustration only. The teachings of the present invention can be used to create suitable templates (with CMS-specific tasks and pre-determined synchronization events) that allow split processing of a single workflow across more than two CMSs as well. Furthermore, instead of a user creating new templates by determining appropriate locations of synchronization events and tasks that are being managed, in certain embodiments, existing templates may be suitably modified (e.g., by adding new tasks and/or corresponding synchronization events) using the teachings of the present invention to accomplish desired split processing.

It is noted here that the foregoing discussion focused on transcoding and QA related tasks as examples only. More generally, a CMS may perform three types of tasks: (1) internal processing tasks such as examining the metadata for a video, and creating versions of the metadata based upon business rules and other functions implemented in the CMS; (2) human managed tasks such as, for example, instructing users to do a function (e.g., review a video, approve a step in the process, edit a video (e.g., on a computer outside the user's systems), etc.); and (3) tasks related to CMS managed devices such as, for example, transcoders, QA systems, watermarking systems, and other unanticipated devices that may be managed by the CMS to process the video, audio or other elements managed by the CMS. In further embodiments of the present invention, all three types of tasks may be enhanced to have the synchronization event delivered after task completion, even when certain tasks are managed by people and/or other devices.

The foregoing describes a system and method for synchronization of workflows in a video file workflow system. The present invention supports the creation of a workflow that splits execution of the workflow tasks (in a single, video file workflow) across multiple workflow systems. For example, a single workflow may be split across two workflow systems that jointly perform the overall workflow. The two resulting workflows are created to essentially mirror each other so that each CMS can track the tasks being executed on the other CMS using synchronization messages. Hence, both CMSs have the same representation of the processing status of the video content at all time. The present invention thus allows for dual tracking of the workflow process and for independent operations (at different CMSs) when the CMS systems require load balancing. The teachings of the present invention can be implemented in the workflows themselves, without requiring any modification of the software of the workflow systems managing those workflows. If needed, only the templates on the workflow systems may be simply modified to accomplish split processing as per the teachings of the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of managing a single workflow for video content on a pair of separate Content Management Systems (CMSs) including a first CMS and a second CMS, the method comprising:
   dividing the single workflow into a pair of mirrored workflows including a first workflow and a second workflow, wherein the first and the second workflows jointly represent all tasks defined in the single workflow;
   sequentially executing first tasks in the first workflow using the first CMS while tracking execution of the first tasks by the first CMS using corresponding first mirrored tasks in the second workflow in the second CMS; and
   upon conclusion of execution of the first tasks by the first CMS, sequentially executing second tasks in the second workflow using the second CMS while tracking execution of the second tasks by the second CMS using corresponding second mirrored tasks in the first workflow in the first CMS, thereby maintaining an identical representation of execution of the single workflow on each of the first and the second CMSs.

2. The method of claim 1, further comprising defining the single workflow as if the single workflow were to be executed on a single CMS.

3. The method of claim 1, wherein the first tasks and the first mirrored tasks relate to transcoding of the video content.

4. The method of claim 3, wherein the second tasks and the second mirrored tasks relate to Quality Assurance (QA) of the transcoding of the video content.

5. The method of claim 1, further comprising:
   configuring a first template for the first workflow to provide an ordered sequence of the first tasks and the second mirrored tasks in the first workflow; and
   configuring a second template for the second workflow to provide an ordered sequence of the first mirrored tasks and the second tasks in the second workflow.

6. The method of claim 5, further comprising:
   displaying the first template on a first display terminal associated with the first CMS; and
   displaying the second template on a second display terminal associated with the second CMS.

7. The method of claim 1, wherein sequentially executing the first tasks includes:
   using the first CMS to send a synchronization event to the second CMS after execution of each task in the first tasks and before commencement of execution of a subsequent task in the first tasks, thereby enabling the second CMS to track execution of the first tasks by the first CMS using the first mirrored tasks in the second workflow therein and to also maintain an identical representation as in the first CMS as to completion status of the first tasks in the first workflow.

8. The method of claim 1, wherein sequentially executing the second tasks includes:
   using the second CMS to send a synchronization event to the first CMS after execution of each task in the second tasks and before commencement of execution of a subsequent task in the second tasks, thereby enabling the first CMS to track execution of the second tasks by the second CMS using the second mirrored tasks in the first workflow therein and to also maintain an identical representation as in the second CMS as to completion status of the second tasks in the second workflow.

9. A method of managing a single workflow for video content on a pair of separate Content Management Systems (CMSs) including a first CMS and a second CMS, the method comprising:
   defining the single workflow as if the single workflow were to be executed on a single CMS;
   dividing the single workflow into a pair of mirrored workflows, wherein workflows in the pair of mirrored workflows jointly perform all tasks defined in the single workflow, and wherein the pair of mirrored workflows includes:
      a first workflow that includes a first set of tasks to be executed by the first CMS and a first set of mirrored tasks for the first CMS to track execution of tasks by the second CMS, and
      a second workflow that includes a second set of tasks to be executed by the second CMS and a second set of mirrored tasks for the second CMS to track execution of tasks by the first CMS,
      wherein the first set of mirrored tasks corresponds to the second set of tasks and the second set of mirrored tasks corresponds to the first set of tasks;
   sequentially executing tasks in the first set of tasks in the first workflow using the first CMS;
   using the first CMS, synchronizing execution of the first set of tasks with the second CMS via the second set of mirrored tasks;

upon conclusion of execution of tasks in the first set of tasks by the first CMS, sequentially executing tasks in the second set of tasks in the second workflow using the second CMS; and using the second CMS, synchronizing execution of the second set of tasks with the first CMS via the first set of mirrored tasks, thereby maintaining an identical representation of execution of the single workflow on each of the first and the second CMSs.

10. The method of claim 9, wherein synchronizing execution of the first set of tasks includes:

using the first CMS, sending a synchronization event to the second CMS after execution of each task in the first set of tasks and before commencement of execution of a subsequent task in the first set of tasks; and in response to receiving the synchronization event from the first CMS, the second CMS using the second set of mirrored tasks therein to track execution of the first set of tasks in the first CMS so as to maintain an identical representation as in the first CMS as to completion status of the first set of tasks in the first workflow.

11. The method of claim 9, wherein synchronizing execution of the second set of tasks includes:

using the second CMS, sending a synchronization event to the first CMS after execution of each task in the second set of tasks and before commencement of execution of a subsequent task in the second set of tasks; and in response to receiving the synchronization event from the second CMS, the first CMS using the first set of mirrored tasks therein to track execution of the second set of tasks in the second CMS so as to maintain an identical representation as in the second CMS as to completion status of the second set of tasks in the second workflow.

12. The method of claim 9, further comprising:

configuring a template for the first workflow to provide an ordered sequence of the first set of tasks and the first set of mirrored tasks in the first workflow; and displaying the template on a display terminal associated with the first CMS.

13. The method of claim 9, further comprising:

configuring a template for the second workflow to provide an ordered sequence of the second set of tasks and the second set of mirrored tasks in the second workflow; and displaying the template on a display terminal associated with the second CMS.

14. A system for splitting execution of a single workflow for video content across a pair of separate Content Management Systems (CMSs) including a first CMS and a second CMS, the system comprising:

a first computing unit having the first CMS and configured to perform the following using the first CMS:

receive a first workflow containing a first portion of tasks from the single workflow, wherein the first workflow includes a first set of tasks and a first set of mirrored tasks, sequentially execute tasks in the first set of tasks, and upon conclusion of execution of the first set of tasks, track execution of tasks by the second computing unit using the first set of mirrored tasks; and a second computing unit having the second CMS and configured to perform the following using the second CMS:

receive a second workflow containing a second portion of tasks from the single workflow, wherein the second workflow includes a second set of tasks and a second set of mirrored tasks, wherein the first and the second portions jointly represent all tasks in the single workflow, and wherein the second set of tasks corresponds to the first set of mirrored tasks and the second set of mirrored tasks corresponds to the first set of tasks, while the first computing unit is executing the first set of tasks, track execution of tasks by the first computing unit using the second set of mirrored tasks, and sequentially execute tasks in the second set of tasks upon conclusion of execution of the first set of tasks by the first computing unit.

15. The system of claim 14, wherein the first set of tasks and the second set of mirrored tasks relate to transcoding of the video content, and wherein the second set of tasks and the first set of mirrored tasks relate to Quality Assurance (QA) of the transcoding of the video content.

16. The system of claim 14, wherein, using the first CMS, the first computing unit is further configured to display a first template providing an ordered sequence of the first set of tasks and the first set of mirrored tasks in the first workflow, and wherein, using the second CMS, the second computing unit is further configured to display a second template providing an ordered sequence of the second set of tasks and the second set of mirrored tasks in the second workflow.

17. The system of claim 14, wherein the first computing unit is further configured to perform the following using the first CMS:

send a first synchronization event to the second CMS at the second computing unit after execution of each task in the first set of tasks and before commencement of execution of a subsequent task in the first set of tasks; and receive a second synchronization event from the second CMS and to responsively use the first set of mirrored tasks to track execution of the second set of tasks by the second computing unit so as to maintain an identical representation as in the second computing unit as to completion status of the second set of tasks in the second workflow.

18. The system of claim 14, wherein the second computing unit is further configured to perform the following using the second CMS:

send a first synchronization event to the first CMS at the first computing unit after execution of each task in the second set of tasks and before commencement of execution of a subsequent task in the second set of tasks; and receive a second synchronization event from the first CMS and to responsively use the second set of mirrored tasks to track execution of the first set of tasks by the first computing unit so as to maintain an identical representation as in the first computing unit as to completion status of the first set of tasks in the first workflow.

\* \* \* \* \*